United States Patent [19]

Ueki

[11] Patent Number: 5,036,264
[45] Date of Patent: Jul. 30, 1991

[54] BRUSHLESS MOTOR WITH NO ROTOR-POSITION SENSOR

[75] Inventor: Yasuhiro Ueki, Sagamihara, Japan

[73] Assignee: Victor Company of Japan, Ltd., Japan

[21] Appl. No.: 531,489

[22] Filed: May 31, 1990

[30] Foreign Application Priority Data

May 31, 1989 [JP] Japan ............................. 1-139560

[51] Int. Cl.$^5$ .................. H02P 6/02; H02K 29/12
[52] U.S. Cl. ................................ 318/254; 318/138
[58] Field of Search ................... 318/138, 254, 439

[56] References Cited

U.S. PATENT DOCUMENTS

| 4,162,435 | 7/1979 | Wright | 318/138 |
| 4,525,657 | 6/1985 | Nakase et al. | 318/254 |
| 4,603,283 | 7/1986 | Oltendorf | 318/138 X |
| 4,631,459 | 12/1986 | Fujioka et al. | 318/254 |
| 4,928,043 | 5/1990 | Plunkett | 318/254 |
| 4,937,508 | 6/1990 | Rozman | 318/254 |

FOREIGN PATENT DOCUMENTS

| 53-14282 | 5/1978 | Japan . |
| 58-119794 | 7/1983 | Japan . |
| 60-82087 | 5/1985 | Japan . |
| 61-22787 | 1/1986 | Japan . |

Primary Examiner—Bentsu Ro
Attorney, Agent, or Firm—Lowe, Price, LeBlanc & Becker

[57] ABSTRACT

A sensorless-type brushless motor equipped with a rotor having a plurality of magnet poles and a stator having a plurality of multi-phase drive coils to generate a rotational torque with respect to the rotor. The motor is arranged to be controllable by a control circuit arrangement which includes a drive pulse generation section for generating drive pulses corresponding to the rotational speed of the rotor and a motor drive section for supplying drive signals in shifts to the coils in response to the drive pulses so as to rotationally drive the rotor. Also included is a timing signal generation section for producing timing signals indicative at least two timings corresponding to a flowing time period for which the drive signal is supplied to at least one of the coils, on the basis of the rotor speed. The timing signal generation section is coupled to a voltage measurement section which is in turn coupled to an input terminal of the coil for measuring voltages at the input terminal in response to the produced timing signals. A correction signal generation section produces a correction signal on the basis of the voltage values measured by the voltage measurement section. The correction signal is supplied to the drive pulse generation section so as to correct the timing of generation of the drive pulses on the basis of the correction signal.

3 Claims, 10 Drawing Sheets

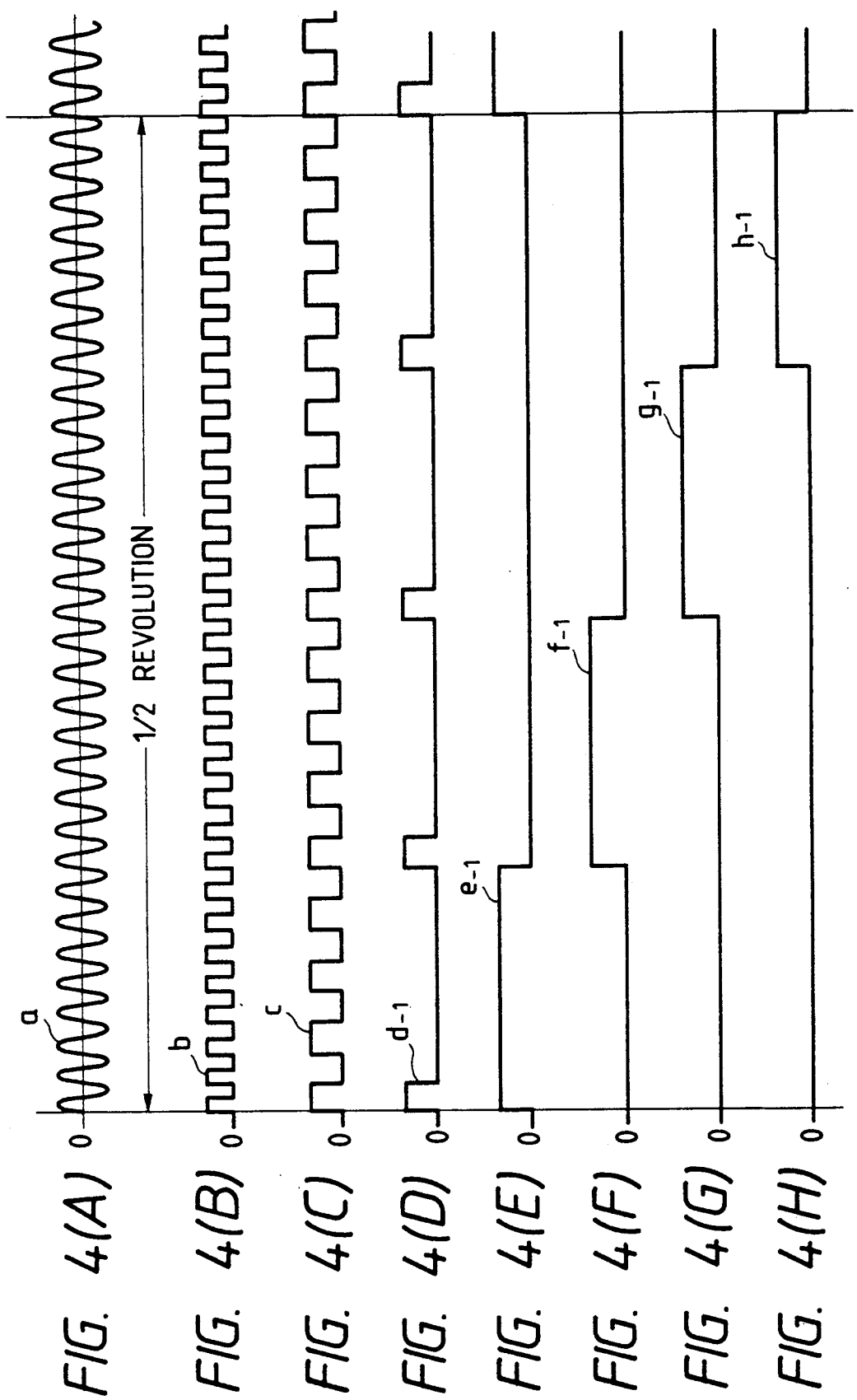

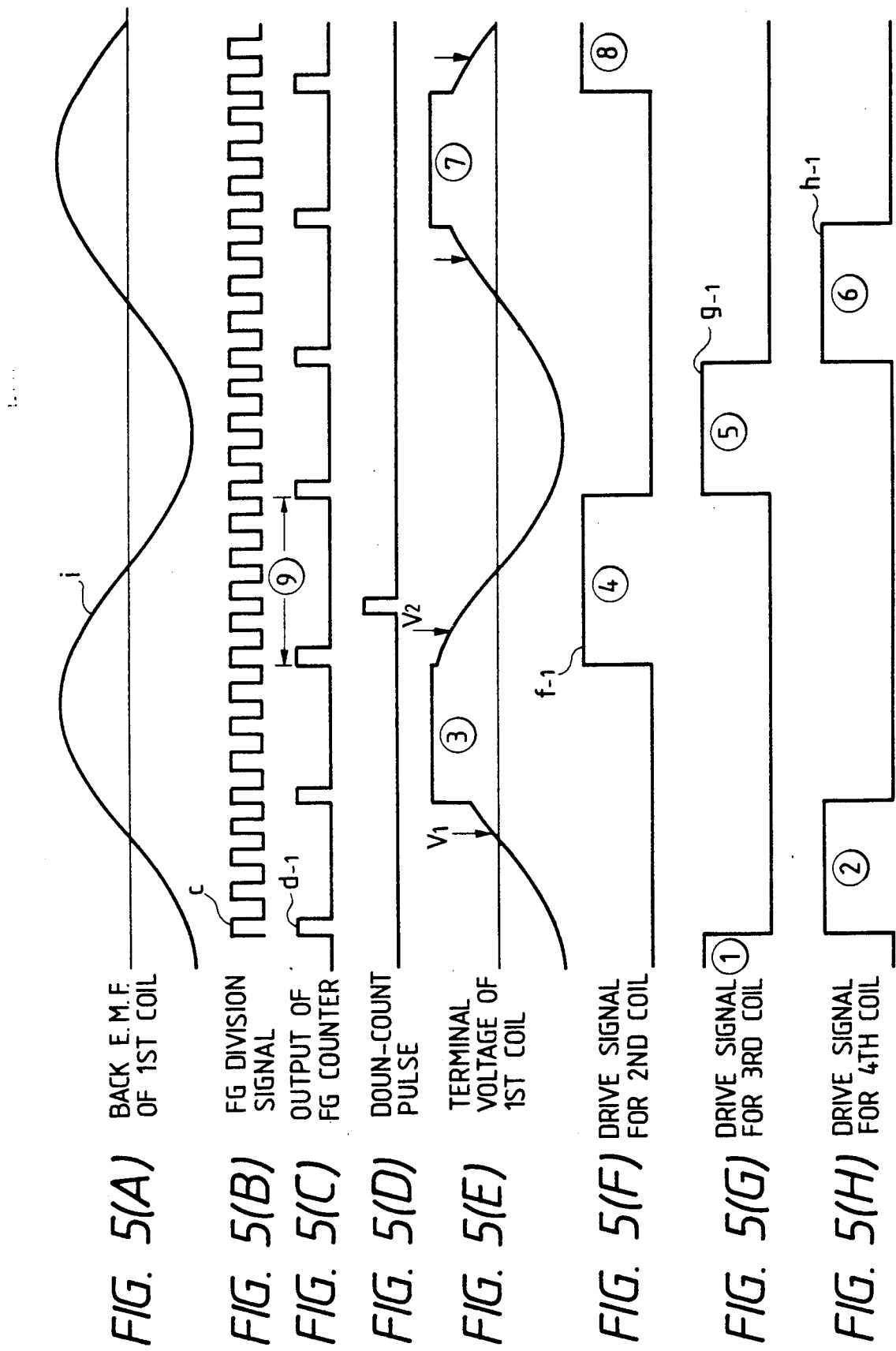

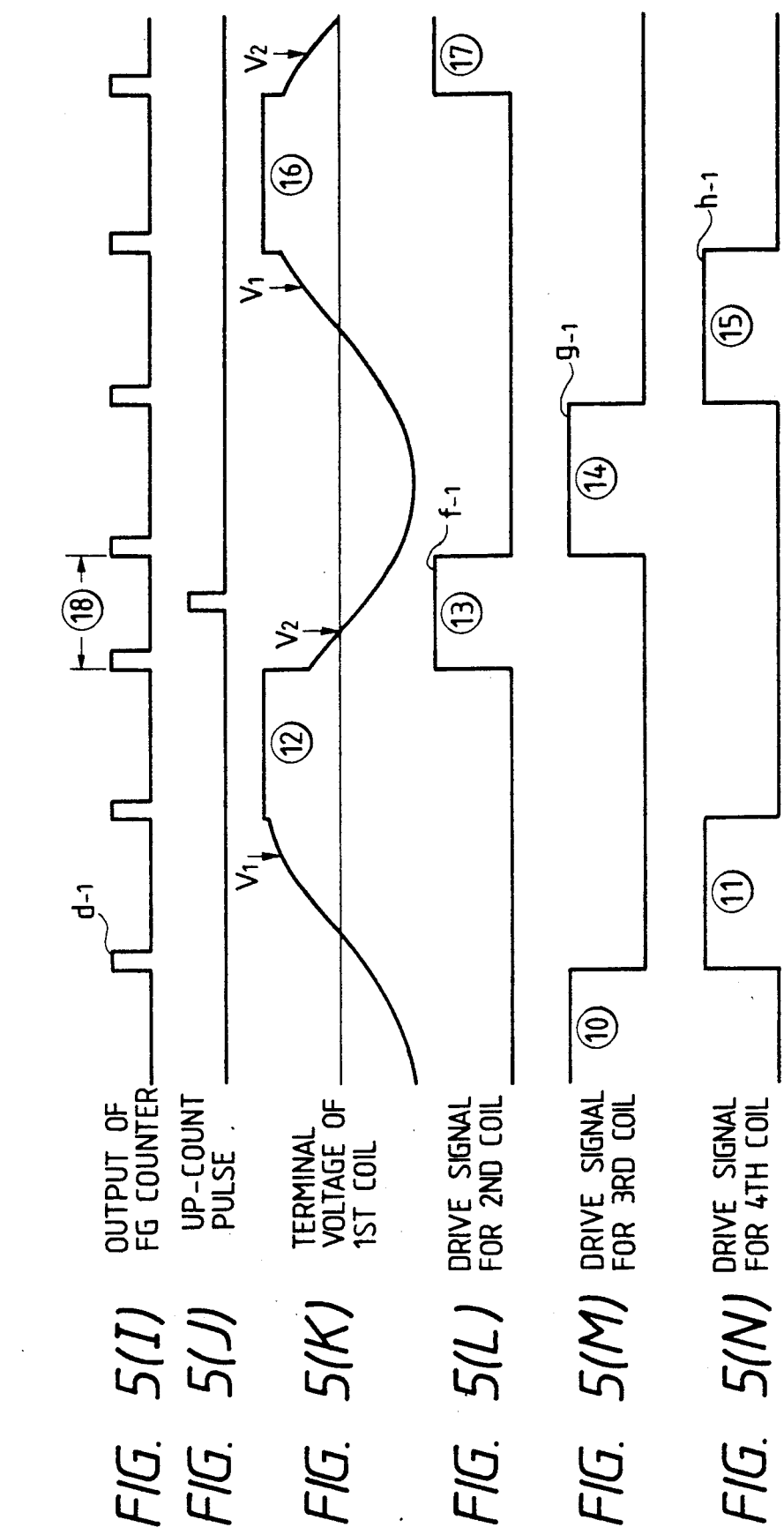

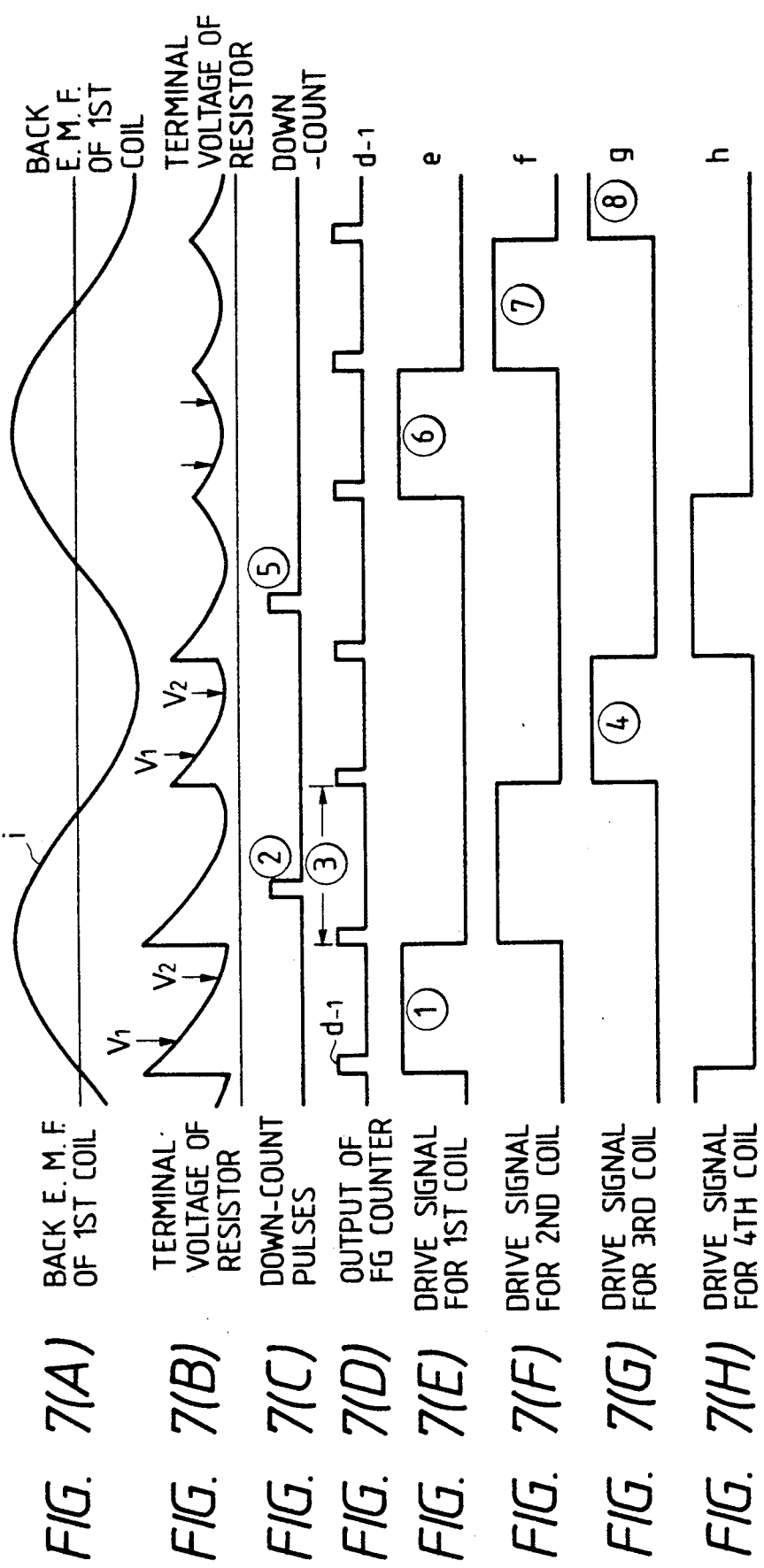

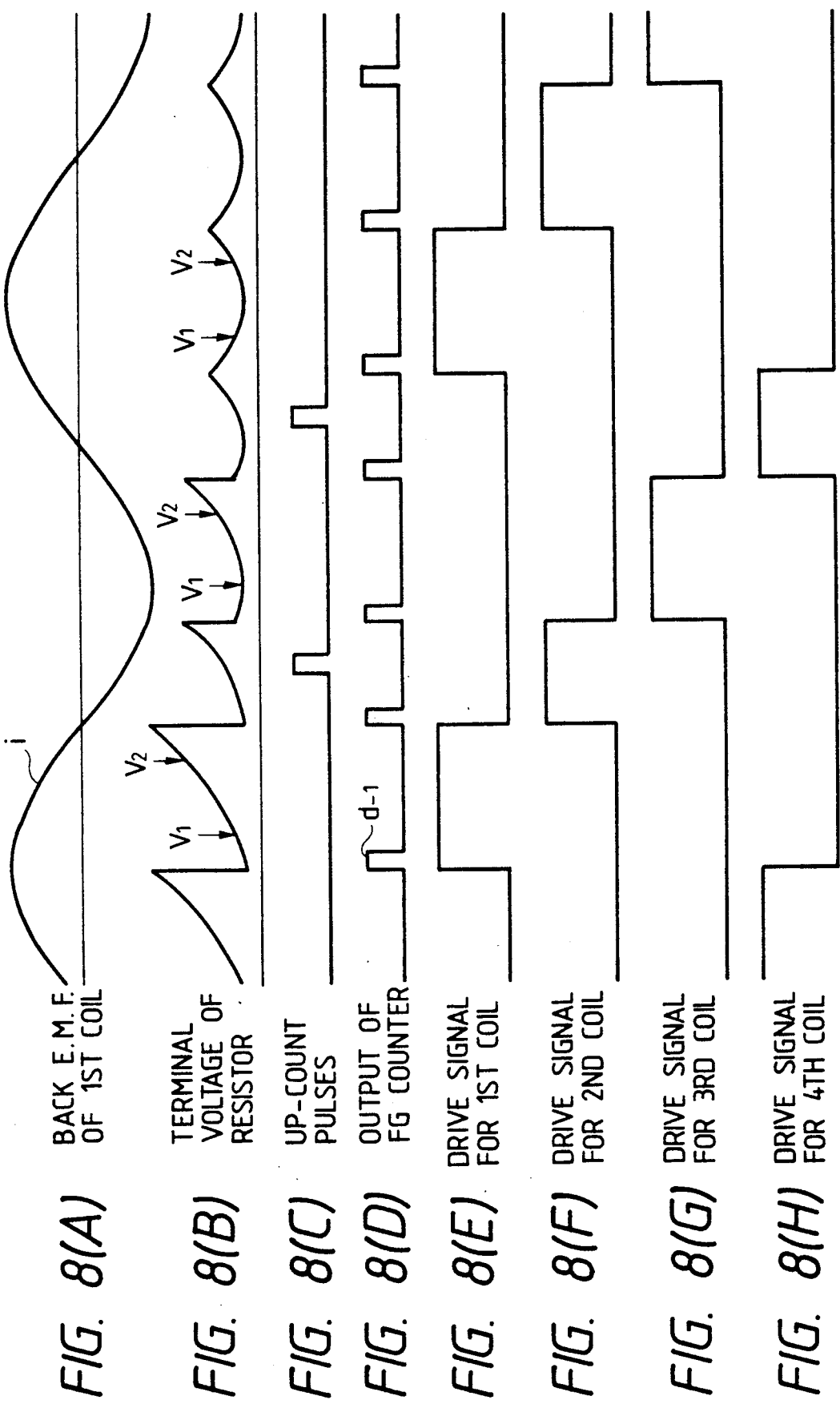

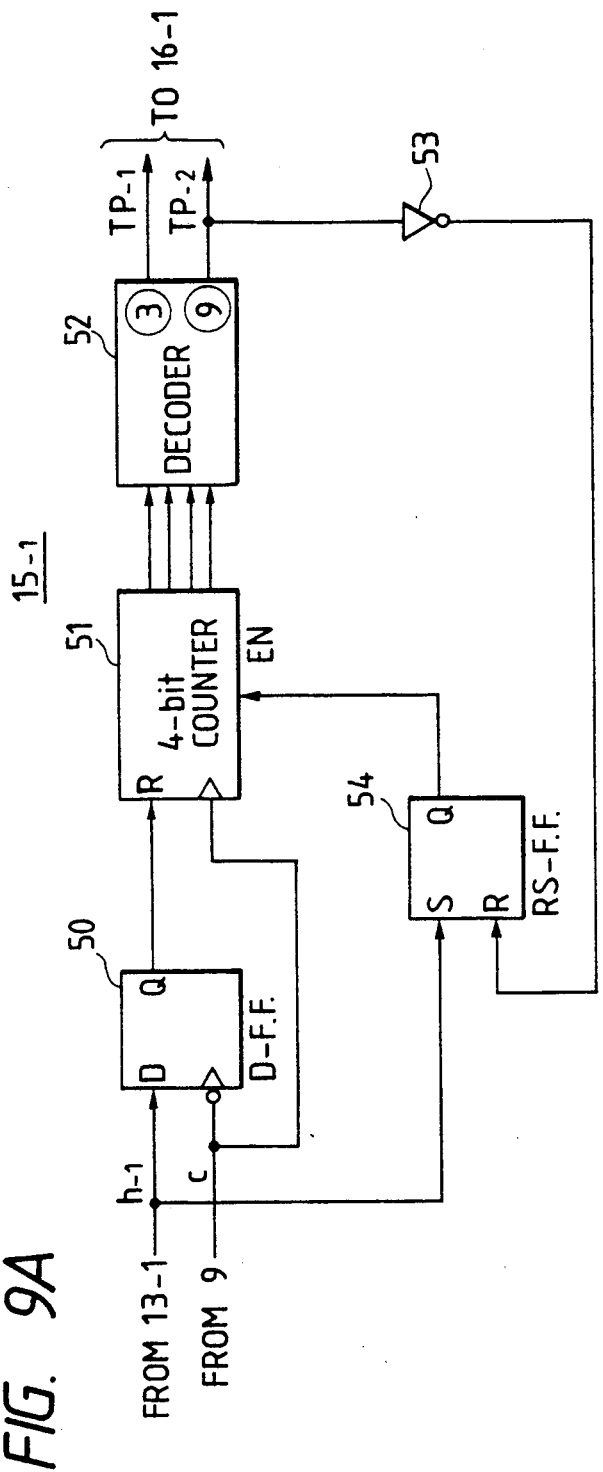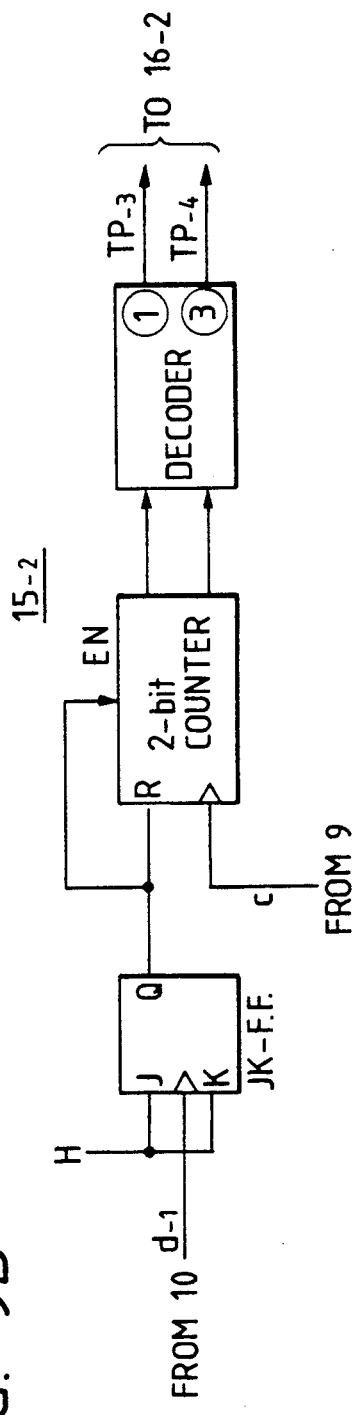
FIG. 9A
FIG. 9B

BRUSHLESS MOTOR WITH NO ROTOR-POSITION SENSOR

BACKGROUND OF THE INVENTION

The present invention relates to a brushless motor which dispenses with sensing devices to detect the position of a rotor, such a brushless motor will be referred hereinafter to as a sensorless-type brushless motor.

One example of conventional brushless motors such as disclosed in Japanese Patent Provisional Publication No. 58-119794 will be described hereinbelow with reference to FIGS. 1 and 2. In FIG. 1, the brushless motor includes a rotor (not shown) having on its surface a disc-like drive magnet 2 permanently magnetized with magnetic fields so as to form four poles 2a indicated alternately by N and S and a stator (not shown) having therein four-phase drive coils 3 disposed to be opposed relation to the poles 2a thereof. On the circumference of the drive magnet 2 is disposed an annular FG magnet 4 having FG (frequency generator) poles 4a whose number is 128. On the stator is provided a FG head 5 which serves as an electro-magnetic converting device. The FG head 5 is disposed to be in opposed relation to the FG poles so as to make up a frequency generator (FG) 6 which generates a detection signal indicative of the rotational speed of the rotor. Further, at the vicinity of the circumference of the rotor is disposed a PG (pulse generator) magnet 32 which has a single PG pole 32a and in the stator is provided a PG head 33 which acts as an electro-magnetic converting device. The PG head 33, together with the PG magnet 32, makes up a pulse generator (PG) 34 which generates a detection signal indicative of the rotational position of the rotor.

In the response to rotation of the rotor, the PG head 33 produces a PG output l (C-1 of FIG. 2) at every one revolution of the rotor, i.e., every time the PG head 33 faces the PG pole 32a of the PG magnet 32. The PG output l is supplied to a waveform shaping circuit 7-2 so as to be wave-shaped to be a rectangular signal which is in turn supplied as an index signal m (C-2 of FIG. 2) to an FG frequency divider 39. On the other hand, the FG head 5 produces an FG output a (A of FIG. 2) whose frequency is proportional to 64-cycle rotational speed per one revolution of the rotor, the FG output a being supplied to a waveform shaping circuit 7-1 so as to be fed as an FG signal b (B of FIG. 2) having a rectangular configuration to a start confirmation circuit 8, the FG frequency divider 39 and a constant-speed control circuit 14.

During the stop of the rotor, the start confirmation circuit 8 is operated so that an electronic switch 12 is switched to the left side in FIG. 1 to transmit a start signal generated by an oscillation start circuit 11 to a brushless motor drive circuit 13-2. In response to the start signal, the drive circuit 13-2 feeds drive signals in shifts to the above-mentioned four-phase drive coils 3 whereby the rotor is rotationally driven. Further, in response to the FG signal b, the start confirmation circuit 8 confirms that the rotational speed of the rotor reaches a predetermined speed and switches the movable contact of the electronic switch 12 to the right side fixed contact thereof in FIG. 1 whereby the output (d-2) of the FG frequency divider 39 is supplied to the drive circuit 13-2. The FG frequency divider 39 divides the FG signal b with a predetermined division ratio (⅛ in this case) and is reset by the index signal m so as to produce drive pulses d-2 (D of FIG. 2). On the basis of the drive pulses d-2, the drive circuit 13-2 produces four-phase current signals e-2, f-2, g-2 and h-2 (E to H of FIG. 2), and supplies drive signals in shifts to the drive coils 3 in accordance with the four-phase current signals e-2, f-2, g-2 and h-2 whereby the rotor is rotationally driven. Moreover, the constant-speed control circuit 14 produces, on the basis of the FG signal b, a constant-speed control signal which is supplied to the drive circuit 13-2. The drive circuit 13-2 controls the drive signals to the drive coils 3 on the basis of the constant-speed control signal to form a negative-feedback loop for the brushless motor whereby the rotor is controlled to be driven at a constant speed.

There is a problem which arises with the above-described brushless motor, however, in that difficulty is encountered to meet the requirement of size-reduction because the pulse generator 34 is disposed at a side portion of the motor output section (comprising the drive magnet 2 and drive coils 3). Another problem is to require troublesome position adjustment of the PG head 33 to increase its cost because of phase adjustment between the PG signal m and the FG signal b. Particularly, in the case that the pulse number of the FG signal b is large, a precise phase adjustment between the PG signal m and the FG signal b can become difficult. Further, although in the conventional brushless motor the drive poles 2a, FG poles 4a and PG pole 32a are arranged to be in predetermined position relationship to each other so that the timings of the four-phase signals e-2, f-2, g-2 and h-2 become appropriate with respect to the back-electromotive force waveforms induced in the four-phase drive coils 3 due to the rotation of the drive poles 2a when the brushless motor is under the rated load operation, when the load varies, due to variation of the armature-reaction occurring in response to the load variation, the timing of generation of the drive signals is shifted (so-called, neutral-point shift) so as to reduce the generation torque of the brushless motor.

SUMMARY OF THE INVENTION

It is therefore an object of the present invention to provide a brushless motor which is capable of dispensing with the pulse generator and further preventing occurrence of the neutral-point shift.

With this and other objects which will become apparent as the description proceeds, a sensorless-type brushless motor according to the present invention is equipped with a rotor having a plurality of first magnet poles of successively alternating polarities and a plurality of second magnetic poles of successively alternating polarities and a stator having a plurality of multi-phase drive coils provided in connection with the first field magnet poles of the rotor to generate a rotational torque with respect to the rotor. The rotational speed of the rotor is arranged to be detectable by rotational speed detecting means provided in conjunction with the plurality of second magnetic poles of the rotor, which detecting means generates a speed detection signal indicative of the detected rotational speed. The detecting means is coupled to drive pulse generation means for generating drive pulses in accordance with the speed detection signal. The generated drive pulses are supplied to motor drive means coupled to said multi-phase coils of the stator for supplying drive signals in shifts to the multi-phase coils thereof in response to the drive pulses so as to rotationally drive the rotor. Also included in the brushless motor is timing signal generation means coupled to the rotational speed detecting means for producing timing signals indicative at least two timings corresponding to a flowing time period for which the drive signal is supplied to at least one of the multi-phase coils, on the basis of the speed detection signal. The timing signal generation means is coupled to voltage measurement means which is in turn coupled to an input terminal of the coil or a junction point coupled in common to output terminals of the multi-phase coils for measuring voltages at the input terminal or the junction point in response to the produced timing signals. Correction signal generation means is coupled to the voltage measurement means and the drive signal generation means so as to produce a correction signal on the basis of the voltage values measured by the voltage measurement means. The produced correction signal is supplied to the drive pulse generation means so as to correct the timing of generation of the drive pulses on the basis of the produced correction signal.

BRIEF DESCRIPTION OF THE DRAWINGS

The present invention will be described in further detail with reference to the accompanying drawings, in which:

FIGS. 4(A) to (H) are waveform illustrations for describing the operation of the FIG. 3 sensorless-type brushless motor;

FIGS. 5(A) to (N) are graphic illustrations for describing a neutral-point adjustment operation in the FIG. 3 brushless motor;

FIGS. 7(A) to (H) and FIGS. 8(A) to (H) are waveform illustrations for describing a neutral-point adjustment operation in FIG. 6 brushless motor; and FIGS. 9A and 9B are block diagrams showing examples of timing generation circuits of FIG. 3 and 6, respectively.

DETAILED DESCRIPTION OF THE INVENTION

Figure 1:
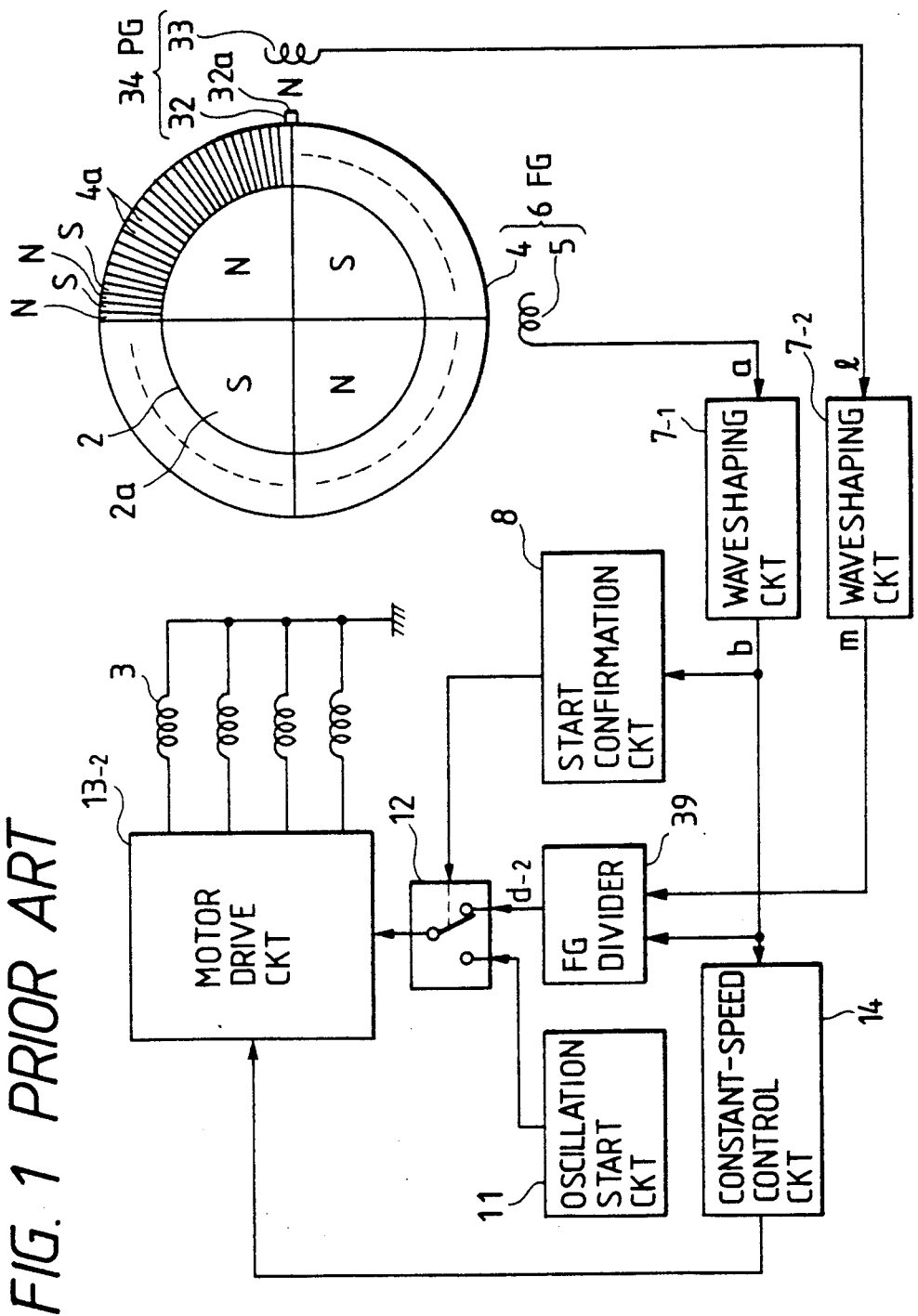
FIG. 1 is a block diagram showing an arrangement of a conventional brushless motor.
Figure 2:
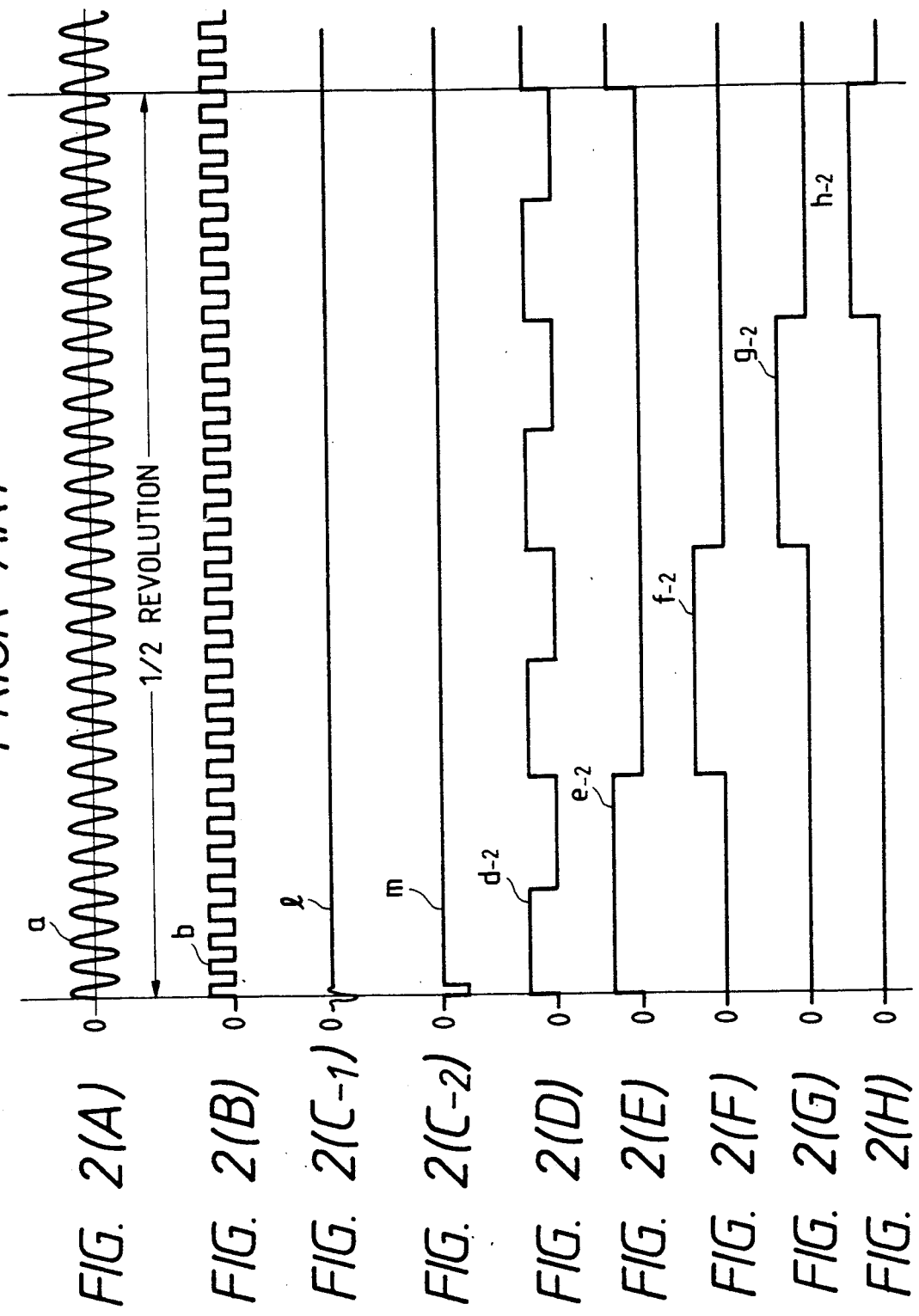
FIGS. 2(A) to (H) are waveform illustrations for describing the operation of FIG. 1 conventional brushless motor.
Figure 3:
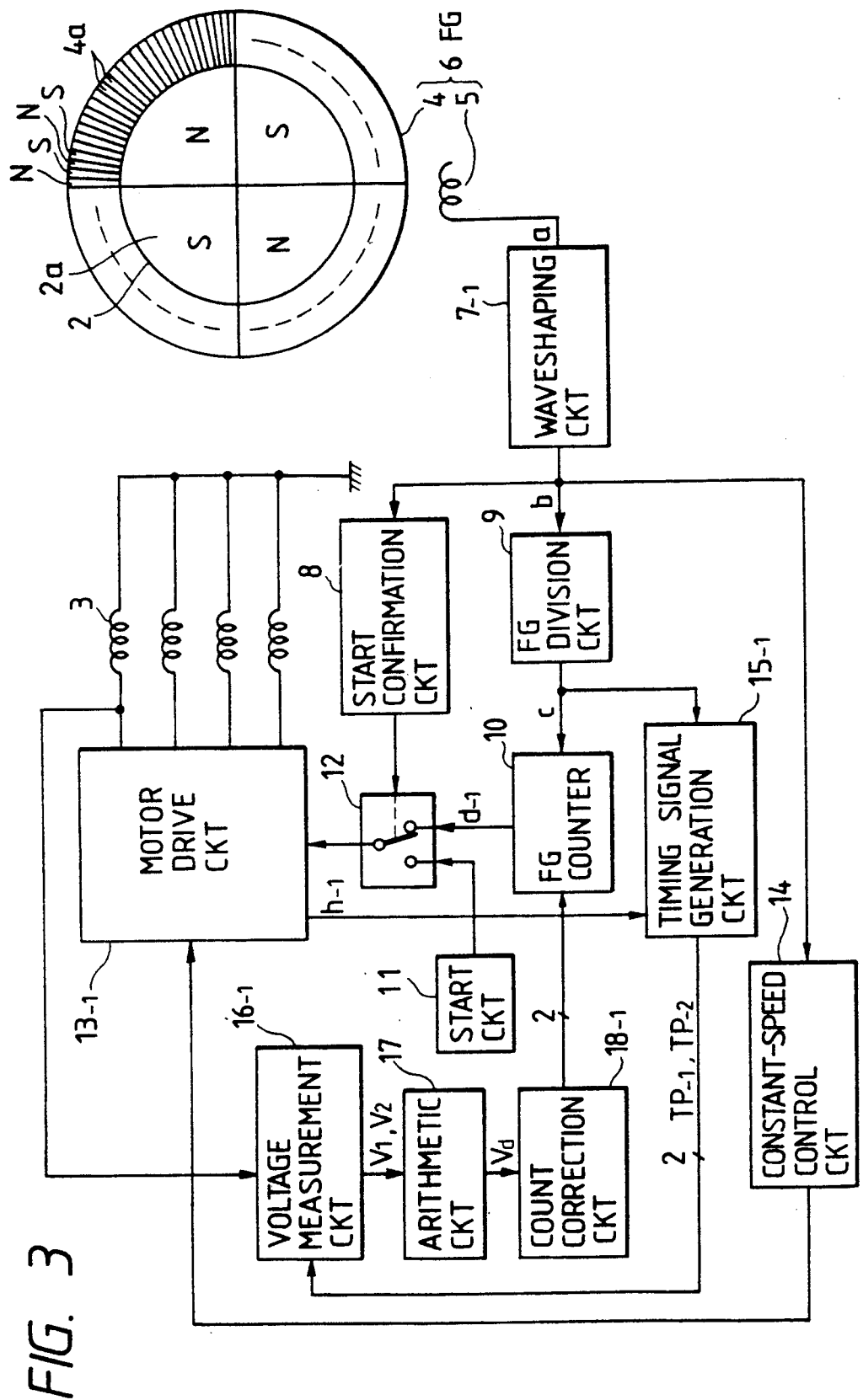
FIG. 3 is a block diagram showing an arrangement of a sensorless-type brushless motor according to a first embodiment of the present invention.

Referring now to FIG. 3, there is illustrated a sensorless-type brushless motor according to an embodiment of the present invention where parts corresponding to those in FIG. 1 are marked with the same numerals and characters. In FIG. 3, the brushless motor of this embodiment similarly includes a rotor (not shown) provided with a disc-like drive magnet 2 permanently magnetized so as to form four poles 2a (alternately arranged N and S poles) and a stator (not shown) having therein four-phase drive coils 3 disposed to be opposed relation to the poles 2a thereof. On the circumference of the drive magnet 2 are disposed an annular FG magnet 4 having FG (frequency generator) poles (alternately arranged N and S poles) 4a whose number is 128, which FG magnet 4, together with a FG head 5 disposed to be in opposed relation thereto, makes up a frequency generator (FG) 6 for generating a detection signal indicative of the rotational speed of the rotor.

With the above-described arrangement, in response to rotation of the rotor, the FG head 5 produces, per one revolution of the rotor, an FG output a (A of FIG. 4) whose frequency is proportional to the rotational speed corresponding to the 64 cycles, the FG output a being supplied to a waveform shaping circuit 7-1 which in turn shapes the FG output a into a rectangular configuration to produce an FG signal b (B of FIG. 4). The FG signal b is supplied to a start confirmation circuit 8, an FG frequency divider 9 and a constant-speed control circuit 14. In the FG frequency divider 9, the FG signal b is divided with a predetermined division ratio (½ in this embodiment) to produce a FG division signal c (C of FIG. 4) which is in turn supplied to a FG counter 10 and a measurement timing signal generation circuit 15-1. The FG counter 10 normally counts the FG division signal c and produces a rectangular drive signal d-1 (D of FIG. 4) which positive-goes whenever the count value reaches a predetermined value. The drive signal d-1 is supplied to an electronic switch 12. Here, the FG counter 10 is compared of a 2-bit up-down counter which counts up with the FG division signal c and an up-count pulse from a count correction circuit 18-1 and counts down with a down-count pulse from the count correction circuit 18-1 which will be described hereinafter, thereby correcting possible neutral-point shift.

When the rotor is at rest, the start confirmation circuit 8 is operated so that the movable contact of the electronic switch 12 is switched to the left side fixed contact in FIG. 3 whereby a start signal generated by an oscillation start circuit 11 is fed to a brushless motor drive circuit 13-1. On the start signal, the drive circuit 13-1 supplies a drive current in shifts to the drive coils 3 so that the rotor, i.e., the drive magnet 2, is rotationally driven. Further, on the basis of the FG signal b, the start confirmation circuit 8 confirms that the rotational speed of the rotor reaches a predetermined speed and operates the electronic switch 12 so that the movable contact thereof is switched to the right side fixed contact thereof whereby the drive signal d-1 is supplied to the drive circuit 13-1. On the basis of the drive signal d-1, the drive circuit 13-1 successively produces four-phase current signals e-1, f-1, g-1 and h-1 (E to H of FIG. 4) in a predetermined order in response to the rising of the drive signal d-1 and alternately applies a drive voltage, which is constant, to the drive coils 3 in accordance with the four-phase current signals e-1, f-1, g-1 and h-1 whereby the rotor is rotationally driven. Here, the rotational speed of the rotor is controlled to be constant by a constant-speed control signal from the constant-speed control circuit 14.

For correction of the neutral-point shift, there are provided the FG counter 10, the measurement timing signal generation circuit 15-1, a voltage measurement circuit 16-1, an arithmetic circuit 17 and the count correction circuit 18. That is, the drive voltage (terminal voltage) to be applied from the drive circuit 13-1 to one of the drive coils (for example, the first-phase drive coil) 3 is arranged to be coupled to the voltage measurement circuit 16-1. Here, when the rotor is rotated, a back electromotive force is induced across each of the drive coils 3 due to magnetic fluxes of the drive magnet 2. A waveform of the back electromotive force induced across the first-phase drive coil 3 is shown as i in FIG. 5(A).

An example of the measurement timing signal generation circuit 15-1 is shown in FIG. 9A, which is composed of a D-type flip-flop 50, a 4-bit counter 51, a decoder 52, an inverter 53 and an RS flip-flop 54. The fourth-phase drive signal h-1 from the motor drive circuit 13-1 is fed to the data input terminal of the D-type flip-flop 50 and to the set terminal of the RS flip-flop 54. The FG division signal c is fed to the D-type flip-flop 50 and the counter 51 as clocks. Thus, the D-type flip-flop 50 outputs through the Q terminal thereof the fourth-phase drive signal h-1 with being delayed by half a period of the FG division signal c to the reset terminal of the counter 51. The outputs of the counter 51 are supplied to the decoder 52, which in turn outputs measurement timing signals TP-1 and TP-2 to the voltage measurement circuit 16-1 when the count value of the counter 51 becomes three and nine, respectively. The measurement timing signal TP-2 is also fed through the inverter 53 to the reset terminal of the RS flip-flop 54, the Q output of which is supplied to the enable terminal of the counter 51. As the result, the measurement timing signal generation circuit 15-1 generates the timing signals TP-1 and TP-2 in correspondence with the fourth pulse and the tenth pulse of the FG division signal c after the termination of the fourth-phase drive signal h-1, that is, the rising edges of the timing signals are earlier by one period of the signal c than the beginning of the first-phase drive signal e-1, and later by one period of the signal c than the termination of the first-phase drive signal e-1, respectively. In the voltage measurement circuit 16-1, the terminal voltage is measured in accordance with the measurement timing signals TP-1 and TP-2 so as to obtain measurement values V1 and V2 corresponding to the two measurement timings. The measurement values V1 and V2 are respectively supplied to the arithmetic circuit 17 which performs subtraction between the measurement values V1 and V2 to obtain a difference voltage Vd (=V1−V2) which is fed to the count correction circuit 18. The count correction circuit 18 produce a count correction signal (up-count pulse or down-count pulse) on the basis of the difference voltage Vd, the drive pulses d-1 being corrected on the basis of the produced count correction signal. That is, when the motor drive signals are appropriate in phase with respect to the back electromotive force waveforms and the absolute value of the difference voltage Vd is equal to or smaller than a threshold Vth, the count correction circuit outputs no pulse, and when the motor drive signals are inappropriately shifted to the advanced side in phase with respect to the back electromotive force waveforms and the sum of the difference voltage Vd and the threshold Vth is negative (i.e. V1−V2+Vth<0), the motor drive signals are completed to be delayed by the time corresponding thereto. Further, in the case where the motor drive signals are inappropriately retarded in phase with respect to the back electromotive force waveforms and the differences obtained by subtracting the threshold Vth from the difference voltage Vd is positive (i.e., V1−V2−Vth>0), the motor drive signals are advanced by the time corresponding thereto. As described above, on the basis of the count correction signal, the FG counter 10 performs control of the count value of the drive signal d-1 so as to effect the correction of the neutral-point.

The above-described operation for the correction of inappropriate phases of the motor drive signals is described more detailedly in the following. FIGS. 5(A) and (B) show the back electromotive force waveform i induced across the first-phase drive coil 3 and the FG division signal c, respectively. FIG. 5(C) to 5(H) illustrated for explanation of a case where inappropriately advanced drive signals are corrected. FIG. 5(c) shows the terminal voltage of the first-phase drive coil 3 which voltage assumes a constant voltage while the first-phase drive signal is applied thereto from the motor drive circuit 13-1 and assumes the back electromotive force while the drive signal therefor is ceased. FIGS. 5(F), (G), and (H) show the drive signals applied to the second-, third and fourth-phase drive coils 3, respectively. In case where the drive signals are inappropriately advanced in phase with respect to the back electromotive force as shown ①, ②, ③, and ④ in FIGS. 5(E) to (H), the measurement values V1 and V2 measured immediately before and after the duration ③ for which the first-phase drive signal is applied assume to satisfy the condition of V1−V2+Vth<0. As the result, the count correction circuit 18-1 produces a down-count pulses as shown in FIG. 5(D), and the interval ⑨ of the drive pulses corresponding to the down-count pulse is prolonged by one period of the FG division signal c, compared with a normal interval (four times the period of the signal c), as shown in FIG. 5(C). Hence, the drive signals generated in response to the drive pulses d-1 are retarded to be corrected as shown with ⑤, ⑥, ⑦ and ⑧ in FIGS. 5(E) to (H).

In case where the drive signals are inappropriately retarded in phase with respect to the back electromotive force as shown with 10 to 13 in FIGS. 5(K) to (N), the measurement values V1 and V2 measured immediately before and after the duration 12 for which the first-phase drive signal is applied assume to satisfy the condition of V1−V2 −Vth>0. As the result, the count correction circuit 18-1 produces an up-count pulse as shown in FIG. 5(J), and the interval 18 of the drive pulses d-1 corresponding to the up-count pulse is shortened by one period of the FG division signal c, compared to the normal interval, as shown in FIG. 5(I). Hence, the drive signals generated in response to the drive pulses d-1 are advanced to be corrected as shown with 14 to 17 in FIGS. 5(K) to (N). When the correction of one cycle is insufficient, the above operation is repeated.

Figure 6:
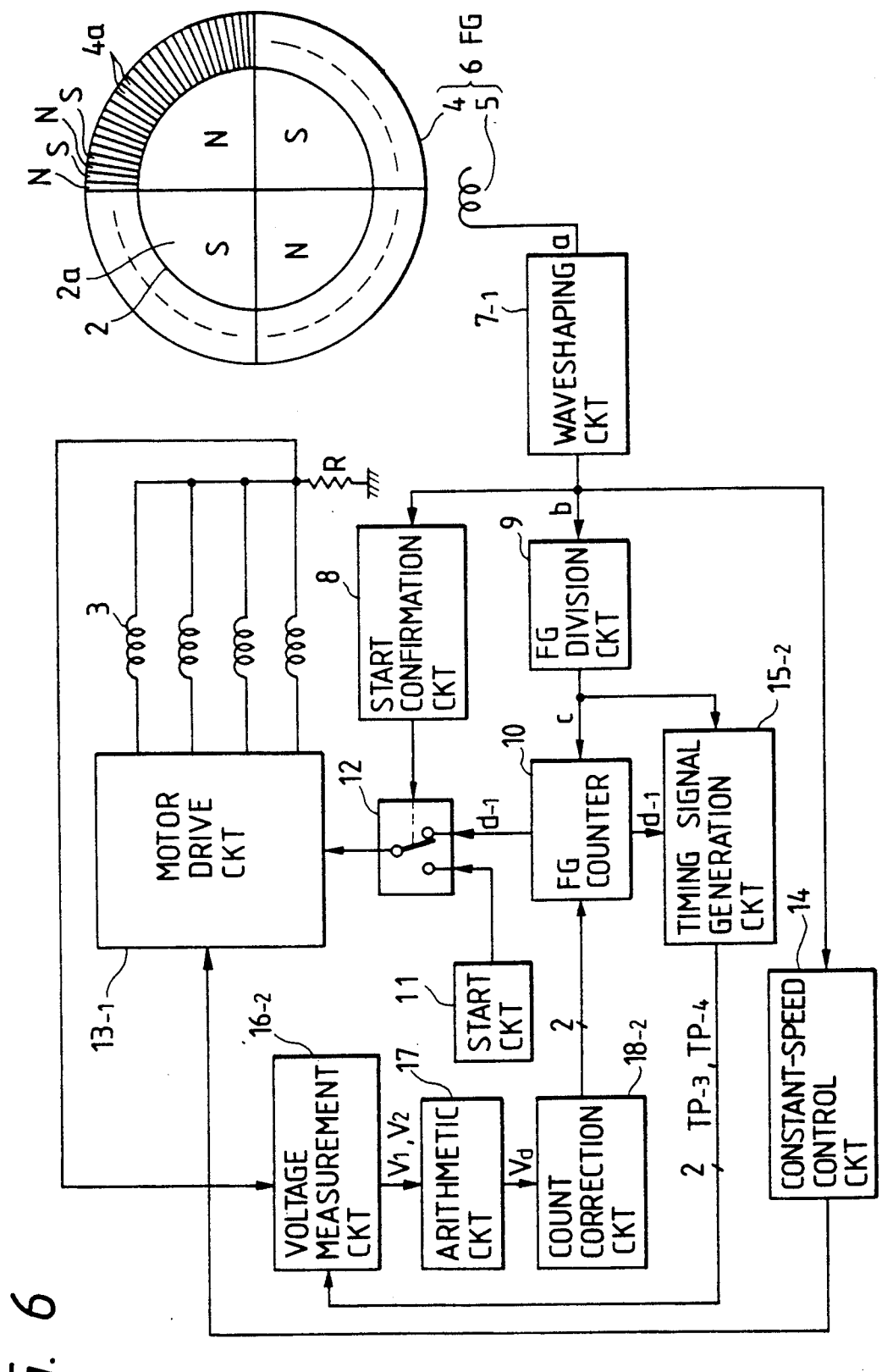
FIG. 6 is a block diagram showing an arrangement of a sensorless-type brushless motor according to a second embodiment of this invention.

FIG. 6 is a block diagram showing an arrangement of a sensorless-type brushless motor according to a second embodiment of the present invention, and FIGS. 7 (A) to (H) and FIGS. 8(A) to (H) are graphic illustrations for describing a neutral-point adjustment operation to be performed by the FIG. 6 brushless motor. Although in the first-described brushless motor the detection of the neutral-point shift is performed on the basis of the terminal voltage of one drive coil representing the counter-electromotive force waveform, one difference between the FIG. 3 brushless motor and the FIG. 6 brushless motor is to, for the detection of the neutral-point shift, use a drive current passing through the drive coil. Parts corresponding to those in FIG. 3 are marked with the same numerals and characters, and the description thereof will be omitted for brevity. In FIG. 6, the sensorless-type brushless motor includes a drive-current detection resistor R whose resistance is small, which resistor R is at one end a common connection point coupled in common to the output terminals of four-phase drive coils 3 and at the other end grounded. The common connection point is also coupled to a voltage measurement circuit 16-2 so that a voltage at the common connection point is applied thereto. The terminal voltage waveforms of the drive current detection resistor R, as illustrated in FIG. 7(B) and FIG. 8(B), correspond to the drive current flowing into the four-phase drive coils 3 due to the difference voltage between the drive voltage and the counter-electromotive force during the flowing time period.

Moreover, the measurement timing signal generation circuit 15-2, which can be constructed as shown in FIG. 9A, produces measurement timing signals indicative of the rising timings of the pulses of the FG signal c after the beginning of the flowing time period and before the terminating of the flowing time period, the produced measurement timing signals being supplied to the voltage measurement circuit 16-2. The voltage measurement circuit 16-2, in response to the measurement timing signals, measures the terminal voltages to obtain measurement values V1 and V2 at the two measurement timings. The measurement values V1 and V2 are used to increase or decrease the count value of the drive pulses d-1, thereby performing correction of the neutral-point shift. As the relationship between the direction of the phase shift of the drive signals and the sign (polarity) of the difference voltage Vd is contrary to that of the first embodiment, the count correction circuit 18-2 produces an up-count pulse when the sum of the difference voltage Vd and a threshold Vth, and produces a down-count pulse when the difference obtained by subtracting the threshold from the difference voltage Vd.

FIGS. 7(A) to (H) are illustrations for explanation of the operation in a case where inappropriately advanced drive signals are retarded to be corrected. When the first-phase drive signal is inappropriately advanced with respect to the back electromotive force (i in FIG. 7(A)) of the first drive coil 3 as shown with ①in FIG. 7(E), the measurement value V1 is substantially larger than the value V2, so that down-count pulse ② is produced and the interval ③ of the drive pulses d-1 are prolonged and the third-phase drive signal ④ is retarded by one period of the FG division signal c. But, the measurement values V1 and V2 during ④ shows that the drive signals are still advanced. Hence, the drive signals are retarded again by further down-count pulses ⑤ and corrected as shown with ⑥, ⑦ and ⑧ in FIGS. 7(E) to (G). FIGS. 8(A) to (H), illustrating a case where inappropriately retarded drive signals are advanced to be corrected, correspond to FIGS. 7(A) to (H), respectively.

Although in the above-described first and second embodiments 16 counts of the FG division signal c are arranged to correspond to an electrical angle 360° of the counter-electromotive force waveform of the first-phase coil so as to increase and decrease the applying time period by the time period corresponding to ± two counts, in the case that the pulse number of the FG signal b is increased for improving the accuracy of the constant-speed control, the accuracy of the neutral-point shift correction can further be improved. In this case, it is required that the measurement timing is not taken at the vicinity of the switching time period from one applying time period to another applying time period, because of generation of noises, occurrence of the transient phenomenon and others. Further, in the case that the pulse number of the FG signal b is small, the division of the FG signal b can be omitted.

In the above-mentioned first and second embodiments, in the case that the neutral-point shift adjustment operation is effected by digital signal processing, a circuit portion therefor can be constructed together with a digital integrated circuit (IC) for rotation of the rotor, and therefore it is possible to considerably keep costs down irrespective of the provision of the circuit for the neutral-point shift adjustment operation. In addition, since the brushless motors in the first and second embodiments are the type of dispensing with a rotor-position detecting device, it is possible to further suppress the manufacturing cost thereof and reduce the size thereof. Moreover, due to the correction of the neutral-point shift, the phase is corrected to be always appropriate irrespective of load variation, thereby allowing drive with high efficiency and suppressing occurrence of torque ripples and noises. Further, due to the neutral-point adjustment, even if the operation of the oscillation start circuit 11 and the switching operation between the oscillation start circuit 11 and the FG counter 10 are somewhat rough, a high-efficiency drive can be effected with no problem, and even if the drive poles 2a is different in position from the FG poles 4a, the high-efficiency drive can be effected. Still further, since the neutral-point shift adjustment is effected concurrently with the switching operation of the switch 12 to the FG counter 10, the drive becomes stable. In addition, since the neutral-point adjustment is performed on the basis of the comparison between the measurement values V1 and V2, the motor operation becomes stable irrespective of difference of the motor characteristic in manufacturing.

It should be understood that the foregoing relates to preferred embodiments of the present invention, and that it is intended to cover all changes and modifications of the embodiments of the invention herein used for the purposes of the disclosure, which do not constitute departures from the spirit and scope of the invention. For example, it is also appropriate to use as a voltage representing the neutral-point shift (counter-electromotive force waveform) the drive voltage to be applied to the drive coil in the case of the constant-current drive.

What is claimed is:

1. A brushless motor including a rotor having a plurality of first magnet poles of successively alternating polarities and a plurality of second magnetic poles of successively alternating polarities and a stator having a plurality of multi-phase drive coils provided in connection with said first magnet poles of said rotor to generate a rotational torque with respect to said rotor, comprising:

rotational speed detecting means provided in conjunction with said plurality of second magnetic poles of said rotor for detecting a rotational speed of said rotor and generating a speed detection signal indicative of the detected rotational speed;

drive pulse generation means coupled to said rotational speed detecting means for generating drive pulses in accordance with said speed detection signal;

motor drive means coupled to said multi-phase coils of said stator for supplying drive current in shifts to said multi-phase coils thereof in response to said drive pulses from said drive pulse generation means so as to rotationally drive said rotor;

timing signal generation means coupled to said rotational speed detecting means for producing timing signals indicative at least two timings before and after a flowing time period that said drive current is supplied to one of said multi-phase coils, on the basis of said speed detection signal;

voltage measurement means coupled to said timing signal generation means and an input terminal of said coil for measuring voltages at said input terminal thereof in response to the produced timing signals; and correction signal generation means coupled to said voltage measurement means and said drive pulse generation means for producing a correction signal on the basis of the voltage values measured by said voltage measurement means, the produced correction signal being supplied to said drive pulse generation means so as to correct the timing of generation of said drive pulses on the basis of the produced correction signal.

2. A brushless motor including a rotor having a plurality of first magnet poles of successively alternating polarities and a plurality of second magnetic poles of successively alternating polarities and a stator having a plurality of multi-phase drive coils provided in connection with said first magnet poles of said rotor to generate a rotational torque with respect to said rotor, comprising:

rotational speed detecting means provided in conjunction with said plurality of second magnetic poles of said rotor for detecting a rotational speed of said rotor and generating a speed detection signal indicative of the detected rotational speed;

drive pulse generation means coupled to said rotational speed detecting means for generating drive pulses in accordance with said speed detection signal;

motor drive means coupled to said multi-phase coils of said stator for supplying drive signals in shifts to said multi-phase coils thereof in response to said drive pulses from said drive pulse generation means so as to rotationally drive said rotor;

timing signal generation means coupled to said rotational speed detecting means for producing timing signals indicative at least two timings after beginning of a flowing time period and before terminating of the flowing time period for which time period said drive signal is supplied to at least one of said multi-phase coils, on the basis of said speed detection signal;

voltage measurement means coupled to said timing signal generation means and further to a junction point coupled in common to output terminals of said multi-phase coils and grounded through a resistor with a predetermined resistance value for measuring voltages at said junction point in response to the produced timing signals; and correction signal generation means coupled to said voltage measurement means and said drive pulse generation means for producing a correction signal on the basis of the voltage values measured by said voltage measurement means, the produced correction signal being supplied to said drive pulse generation means so as to correct the timing of generation of said drive pulses on the basis of the produced correction signal.

3. A brushless motor including a rotor having a plurality of first magnet poles of successively alternating polarities and a plurality of second magnetic poles of successively alternating polarities and a stator having a plurality of multi-phase drive coils provided in connection with said first magnet poles of said rotor to generate a rotational torque with respect to said rotor, comprising:

rotational speed detecting means provided in conjunction with said plurality of second magnetic poles of said rotor for detecting a rotational speed of said rotor and generating a speed detection signal indicative of the detected rotational speed;

drive pulse generation means coupled to said rotational speed detecting means for generating drive pulses in accordance with said speed detection signal and correcting timings of said drive pulses on the basis of a phase correction signal;

motor drive means coupled to said multi-phase coils of said stator for supplying drive current in shifts to said multi-phase coils thereof in accordance with a start signal for starting the rotation of said rotor or said drive pulses so as to rotationally drive said rotor;

oscillation start means for outputting said start signal at the time of start of the rotation of said rotor;

start confirmation means coupled to said rotational speed detecting means for causing said start signal from said oscillation start means to be supplied to said motor drive means at the time of the start of said rotor and causing said drive pulses from said drive pulse generation means to be supplied thereto after the rotational speed of said rotor reaches a predetermined value;

timing signal generation means for producing timing signals indicative of two or more timings corresponding to a flow time period for which said drive current passes through one of said multi-phase coils of said stator;

waveform detection means for detecting a voltage representing a back-electromotive force waveform induced in said multi-phase coil;

voltage measurement means for measuring the voltage detected by said waveform detection means in accordance with the two or more timing signals produced by said timing signal generation means so as to obtain two or more measured voltage values; and phase correction signal generation means for producing a phase correction signal indicative of the timing of said flow time period with respect to the back-electromotive force waveform on the basis of the two or more measured voltage values.

* * * * *